United States Patent
Odagiri

(10) Patent No.: US 9,911,204 B2
(45) Date of Patent: Mar. 6, 2018

(54) IMAGE PROCESSING METHOD, IMAGE PROCESSING APPARATUS, AND RECORDING MEDIUM

(71) Applicant: CANON KABUSHIKI KAISHA, Tokyo (JP)

(72) Inventor: Jun Odagiri, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/238,416

(22) Filed: Aug. 16, 2016

(65) Prior Publication Data

US 2017/0053416 A1    Feb. 23, 2017

(30) Foreign Application Priority Data

Aug. 21, 2015    (JP) .................. 2015-163968

(51) Int. Cl.
*G06K 9/46* (2006.01)
*G06T 7/73* (2017.01)

(52) U.S. Cl.
CPC ...... *G06T 7/74* (2017.01); *G06T 2207/20016* (2013.01)

(58) Field of Classification Search
CPC    G06T 7/001; G06T 7/13; G06T 7/248; G06T 7/74; G06T 7/337; G06T 2207/20016; G06K 9/6282
See application file for complete search history.

(56) References Cited

U.S. PATENT DOCUMENTS

| | | | |
|---|---|---|---|
| 6,785,427 B1* | 8/2004 | Zhou | G06T 3/4038 382/154 |
| 2003/0065654 A1* | 4/2003 | Ikushima | G06F 17/30259 |

FOREIGN PATENT DOCUMENTS

JP    2010-097438 A    4/2010

OTHER PUBLICATIONS

Lei et al.; "optical flow estimation on coarse-to-fine region-trees using discrete optimization"; Computer vision, 2009 IEEE 12th international conference on; Sep. 2009.*

\* cited by examiner

*Primary Examiner* — Eueng-Nan Yeh
(74) *Attorney, Agent, or Firm* — Canon U.S.A., Inc. IP Division

(57) ABSTRACT

A processor performs pattern matching on a search target image using a reference image. The processor uses the reference image to calculate a model pyramid, which has model edges and different layers, and uses the search target image to calculate the search target pyramid, which has search target edges and layers having size reduction factors which are the same as those of the model pyramid. The processor performs pattern matching on the search target pyramid using the model pyramid. Calculation of the model pyramid includes (i) extracting and calculating sizes of edges from the reference image, (ii) obtaining maximum size reduction factors of the individual edges, and (iii) setting an edge (a) which has a size reduction factor equal to or larger than a target layer size reduction factor and (b) which has been subjected to size reduction as a model edge of the target layer.

14 Claims, 12 Drawing Sheets

MODEL PYRAMID    SEARCH TARGET PYRAMID i-TH STEP        (i+1)-TH STEP i-TH STEP        (i+1)-TH STEP

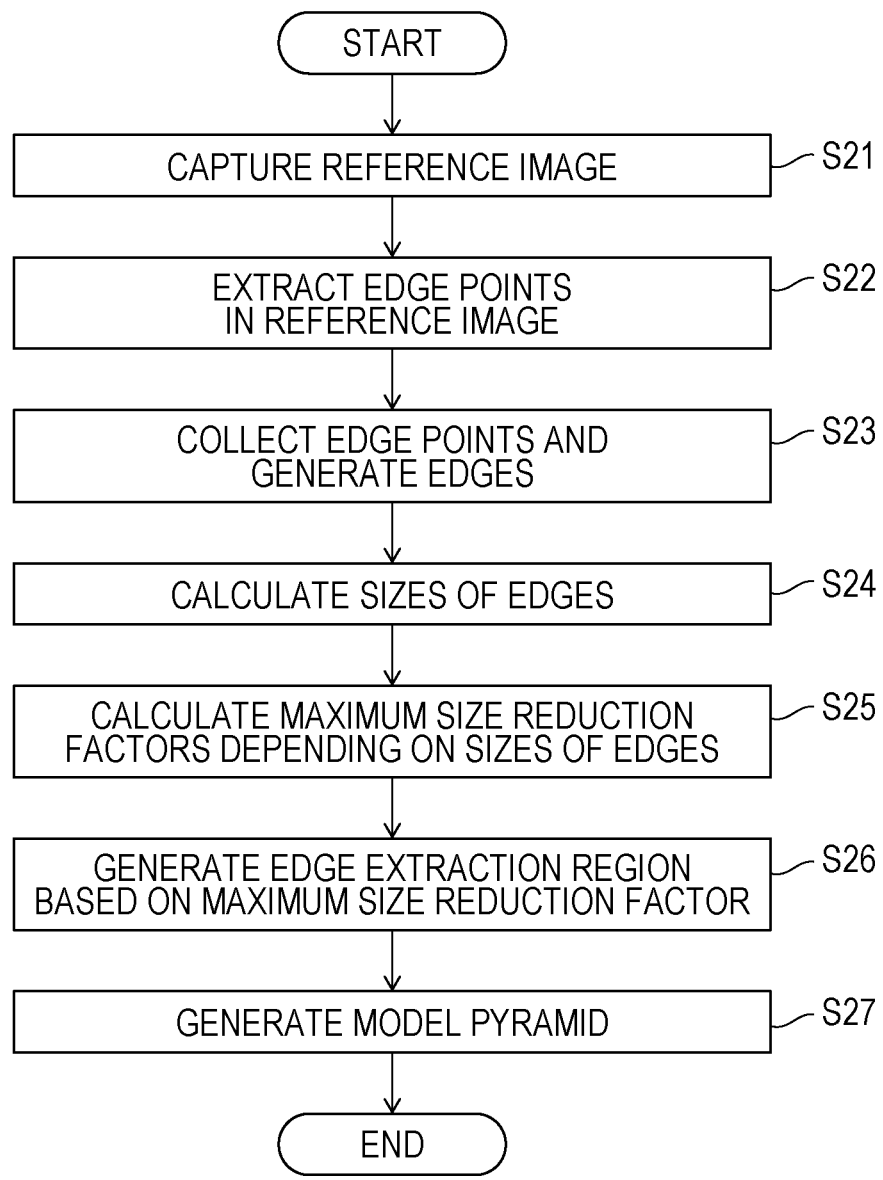

IMAGE PROCESSING METHOD, IMAGE PROCESSING APPARATUS, AND RECORDING MEDIUM

BACKGROUND OF THE INVENTION

Field of the Invention

The present invention relates to an image processing method for performing pattern matching based on a shape using a coarse-to-fine search method, an image processing apparatus, and a recording medium.

Description of the Related Art

In general, in a field of image processing, pattern matching has been widely used as a method for detecting an object (a work) and measuring a position of the object. In particular, pattern matching based on a shape has been widely used since a degree of similarity is calculated only using a portion including a feature of a shape in an image, and therefore, the shape pattern matching is performed at high speed.

In the shape pattern matching, a degree of similarity is calculated using features of shapes of a reference image obtained by capturing a work in an ideal state and a search target image obtained by capturing a target work, and therefore, extraction of the features of shapes from the images is required. As a method for extracting an edge as a shape feature, a method using an edge extraction filter, such as a Sobel filter or a Canny filter, is widely used.

Specifically, the shape pattern matching is a method for generating a model edge using a reference image and a search target edge using a search target image by performing the edge extraction method described above on the reference image and the search target image and for calculating a degree of similarity between the model edge and the search target edge.

An edge is a portion in which a luminance gradient between pixels is large, and is actually a group of edge points. Specifically, a group of edge points arranged in accordance with an arbitrary rule is referred to as an "edge". In general, an edge formed by connecting adjacent edge points to one another is widely used. Since an edge is formed by edge points, image processing using features of the edge may be performed. For example, a feature value, such as an edge size, may be calculated.

As a method for realizing high-speed pattern matching, a coarse-to-fine search method is used. In the coarse-to-fine search method, a rough position is detected using data of a small information amount, and thereafter, a detailed position is detected using data of a large information amount. In practice, first, a process of generating an image of a low resolution by reducing a size of an image of a high resolution is repeatedly performed so that different images of different low resolutions are generated. Subsequently, pattern matching is performed on an image having a lowest resolution so that a rough position of a work is detected. Thereafter, the search is performed only on a range in the vicinity of a preceding detection position in an image of a resolution higher than that of a preceding image so that a detection position may be gradually obtained with higher accuracy. Note that the size reduction may be performed not only on an image but also on a region including an edge to be extracted (hereinafter referred to as an "edge extraction region"), a region including a work to be searched for (hereinafter referred to as "search region"), and an edge.

In general, in a case where the coarse-to-fine search method is employed, an edge of a low resolution is also taken into consideration, and therefore, it is difficult to select an edge to be used as a model and to control parameters. If the size reduction is performed without taking a degree of a feature into consideration, there arises a problem in that an edge having a feature of a small degree blurs and becomes unstable due to environmental influence, and as a result, a detection of a work fails. Furthermore, if the size reduction which causes a blur of an edge is not performed taking a size of an edge into consideration, the coarse-to-fine search method may not be sufficiently performed at high speed.

To address this problem, Japanese Patent Laid-Open No. 2010-97438 proposes a method for determining a size reduction factor of image data in accordance with a degree of sharpness of an edge point. In this method, a size reduction factor based on a degree of sharpness of an edge point is set to an image so that detection is stably performed. However, in Japanese Patent Laid-Open No. 2010-97438, a certain size reduction factor is set to an image, and therefore, if one of edge points has a low degree of sharpness, the size reduction factor suitable for the edge point is set. Accordingly, a large size reduction factor may not be set. If a large size reduction factor may not be set, processing employing the coarse-to-fine search method may not be sufficiently performed at high speed. On the other hand, even in a case where a large size reduction factor may be set since a degree of sharpness is high, if an edge is small, it is likely that the image includes am unstable edge, such as a blur of an edge described above, and accordingly, detection is unstable.

SUMMARY OF THE INVENTION

Accordingly, the present invention realizes pattern matching performed at high speed, with high robustness, and with high accuracy.

According to an aspect of the present invention, an image processing method, that causes a processor to perform pattern matching on a search target image using a reference image, includes causing the processor to calculate a model pyramid which has different layers having different size reduction factors and which includes model edges in individual layers of the model pyramid using the reference image, causing the processor to calculate a search target pyramid which has layers having size reduction factors which are the same as those in the layers of the model pyramid and which includes search target edges in individual layers of the search target pyramid using the search target image, and causing the processor to perform pattern matching on the search target pyramid using the model pyramid, wherein the calculation of the model pyramid includes causing the processor to extract a plurality of edges from, the reference image, causing the processor to calculate sizes of extracted individual edges, causing the processor to obtain maximum size reduction factors of the individual edges in accordance with the calculated sizes of the extracted individual edges, and causing the processor to set, when a target layer which is a target one of the plurality of layers of the model pyramid is to be generated, am edge which has a size reduction factor equal to or larger than a size reduction factor of the target layer and which has been subjected to size reduction by the size reduction factor of the target layer as a model edge of the target layer.

Further features of the present invention will become apparent from the following description of exemplary embodiments with reference to the attached drawings.

According to the present invention, a model pyramid is generated based on maximum size reduction factors calculated in accordance with sizes of edges, and accordingly, an unstable model edge may be prevented from being generated in each of layers of the model pyramid. Accordingly, since pattern matching is performed using the model pyramid which does not include an unstable edge, the pattern matching may be realized at high speed, with high robustness, and with high accuracy.

BRIEF DESCRIPTION OF THE DRAWINGS

FIG. 12 is a flowchart illustrating an image processing method according to a second embodiment.

DESCRIPTION OF THE EMBODIMENTS

Embodiments of the present invention will be described in detail hereinafter with reference to the accompanying drawings. In an example, a model pyramid which has different layers having different size reduction factors and which includes model edges in the individual layers is obtained using the reference image. Specifically, a plurality of edges are extracted from the reference image. Sizes of the individual edges are obtained. Subsequently, maximum size reduction factors corresponding to the sizes of the edges are obtained for individual edges. When a target layer which is a target one of the plurality of layers of the model pyramid is to be generated, am edge which has a size reduction factor equal to or larger than a size reduction factor of the target layer and which has been subjected to size reduction by the size reduction factor of the target layer as a model edge of the target layer.

First Embodiment

Figure 1:
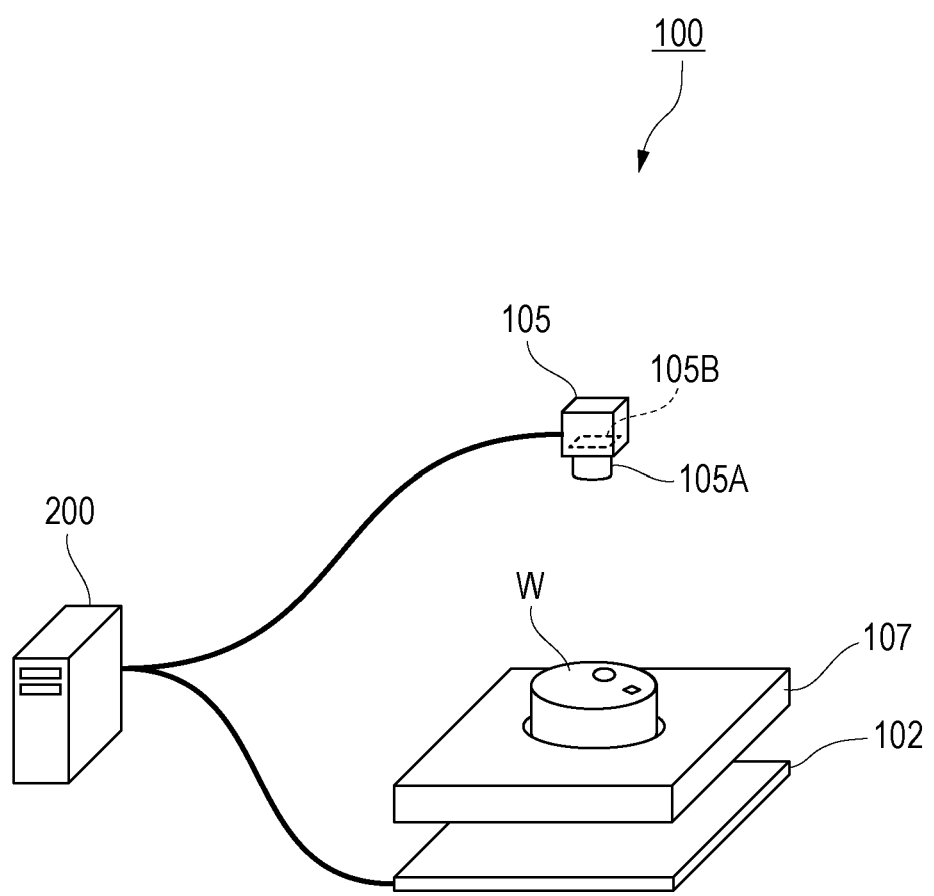
FIG. 1 is a diagram illustrating an image processing system including an image processing apparatus according to a first embodiment.

FIG. 1 is a diagram illustrating an image processing system including an image processing apparatus according to a first embodiment of the present invention. An image processing system 100 includes a light source 102, a camera 105 serving as an imaging apparatus, and an image processing apparatus 200. The light source 102 and the camera 105 are connected to the image processing apparatus 200. A work W which is a detection target object (an object) is held on a work holding stage 107.

The light source 102 is an illumination apparatus which emits (illuminates) light to the work W. Any light source, such as an LED or a halogen lamp, may be employed as the light source 102 as long as the light source 102 emits light of a light amount required for image processing to the work W.

The camera 105 is a digital still camera which generates data on a captured image by receiving light from the work W. The camera 105 includes an imaging lens 105A and an imaging device (a solid-state imaging device) 105B.

The imaging device 105B is an area sensor, such as a complementary metal-oxide semiconductor (CMOS) image sensor or a charge coupled device (CCD) image sensor. The imaging lens 105A is an objective lens unit which controls a factor, and performs control such that the entire work W is captured by the imaging device 105B.

The image processing apparatus 200 performs image processing on a captured image obtained by capturing the work W by the camera 105 so as to obtain a position (including an orientation) of the work W.

Figure 2:
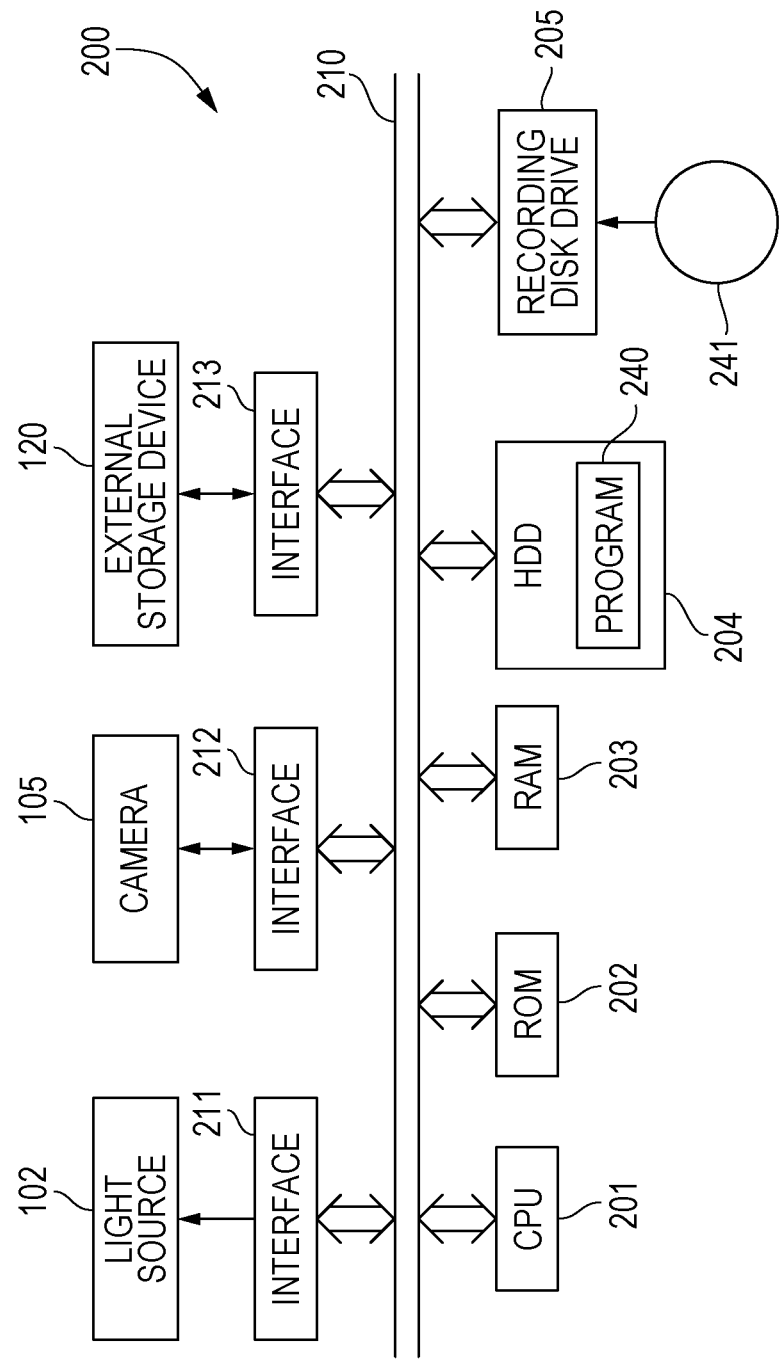
FIG. 2 is a block diagram illustrating the image processing apparatus according to the first embodiment.

FIG. 2 is a block diagram illustrating the image processing apparatus 200 according to the first embodiment of the present invention. The image processing apparatus 200 includes a central processing unit (CPU) 201 serving as a processor (a calculation unit). The image processing apparatus 200 further includes a read only memory (ROM) 202, a random access memory (RAM) 203, and a hard disk drive (HDD) 204 as storage units. The image processing apparatus 200 further includes a recording disk drive 205 and various interfaces 211 to 213.

The ROM 202, the RAM 203, the HDD 204, the recording disk drive 205, and the various interfaces 211 to 213 are connected to the CPU 201 through a bus 210. The ROM 202 stores basic programs such as basic input/output system (BIOS). The RAM 203 is a storage device which temporarily stores various data, such as a result of arithmetic operation processing.

The HDD 204 is a storage device which stores a result of arithmetic operation processing performed by the CPU 201, various data which is externally obtained, and the like, and also records a program 240 which causes the CPU 201 to execute various arithmetic operation processing described below. The CPU 201 executes various steps of an image processing method in accordance with the program 240 recorded (stored) in the HDD 204. Specifically, the CPU 201 performs pattern matching on a search target image using a reference image. The reference image and the search target image are obtained by imaging the work W. The reference image serves as a so-called template (a template image), and the search target image is obtained by imaging the work W to be inspected which is conveyed in a production line or the like.

The recording disk drive 205 may read various data, programs, and the like recorded in a recording disk 241.

The light source 102 connected to the interface 211 is turned on or off under control of the CPU 201.

The camera 105 is connected to the interface 212. The CPU 201 outputs a trigger signal to the camera 105 and causes the camera 105 to capture an image when the camera 105 receives the trigger signal. The camera 105 outputs data on a captured image which is a result of imaging to the CPU 201. The CPU 201 obtains the data on the captured image from the camera 105 and performs image processing on the captured image so that a position of the work W is detected (measured).

An external storage device 120, such as a rewritable nonvolatile memory or an external HDD, is connectable to the interface 213.

Although a case where the HDD 204 is a computer readable recording medium and the program 240 is stored in the HDD 204 is described in the first embodiment, the present invention is not limited to this. The HDD 204 may be recorded in any computer readable recording medium. As a recording medium which supplies the program 240, the ROM 202, a recording disk 241, or the external storage device 120 illustrated in FIG. 2, for example, may be used. Examples of the recording medium include a flexible disk, a hard disk, an optical disc, a magneto-optical disc, a CD-ROM, a CD-R, a magnetic tape, a nonvolatile memory, and a ROM.

Figure 3:
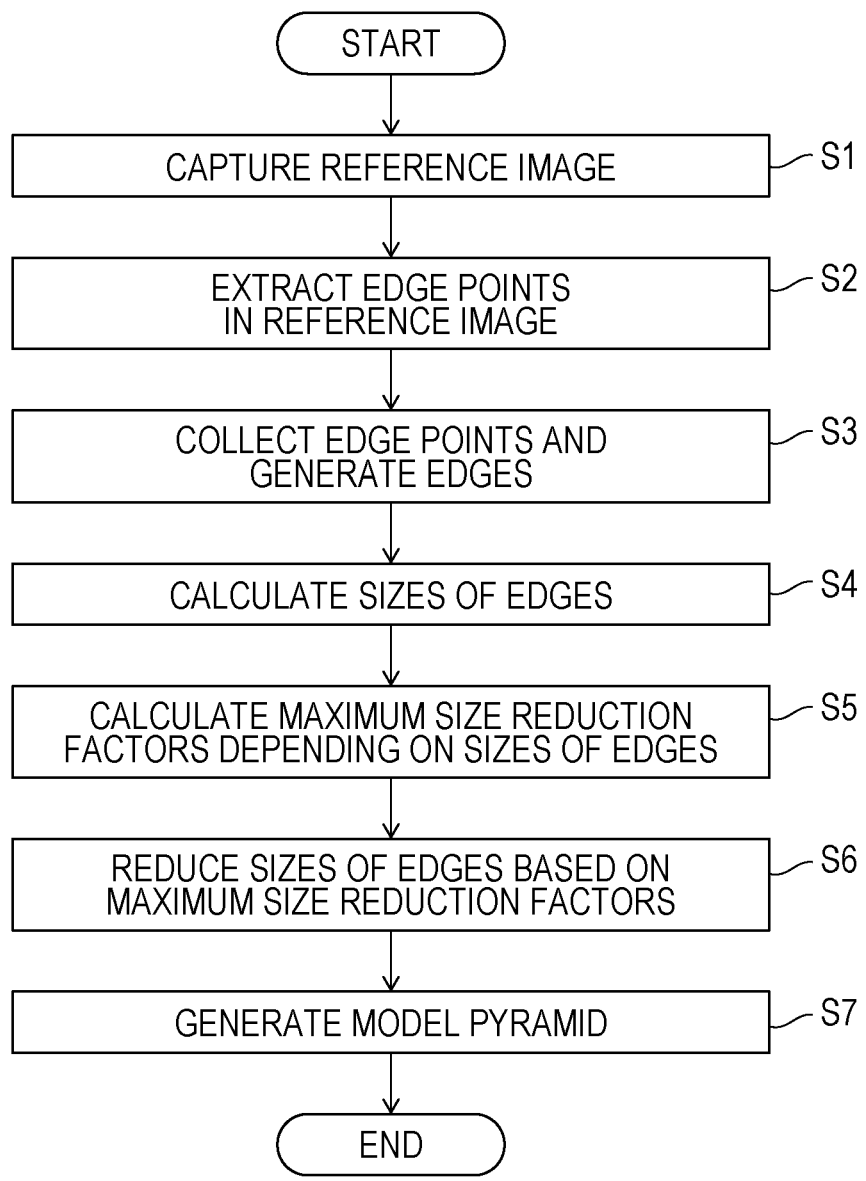
FIG. 3 is a flowchart illustrating an image processing method according to the first embodiment.
Figure 4:
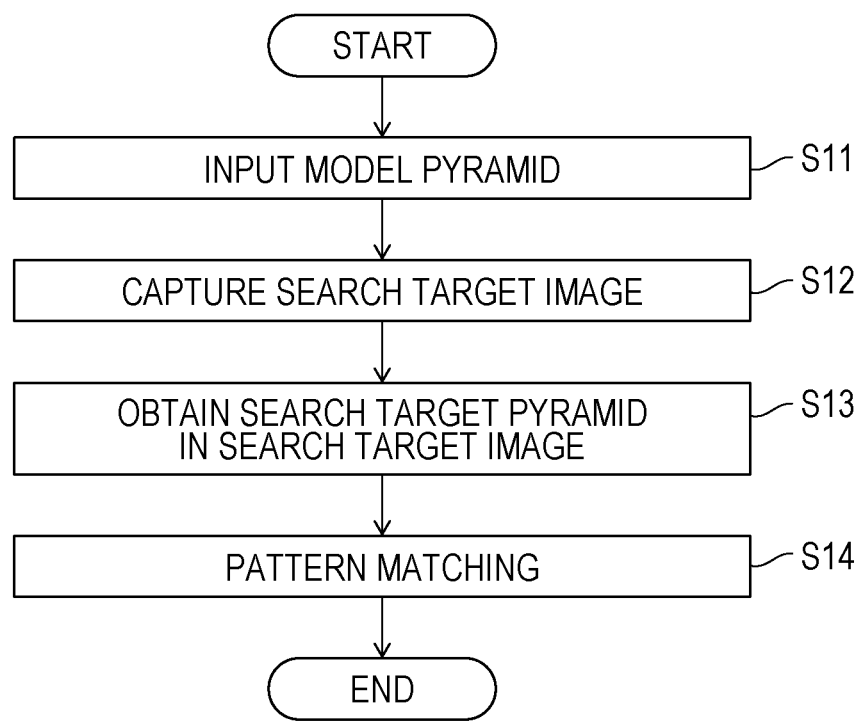
FIG. 4 is a flowchart illustrating the image processing method according to the first embodiment.

FIGS. 3 and 4 are flowcharts illustrating an image processing method according to the first embodiment. In the first embodiment, the CPU 201 executes steps (processes) of the image processing method illustrated in FIGS. 3 and 4 in accordance with the program 240.

The CPU 201 obtains a model pyramid based on a reference image (S1 to S7: a model pyramid calculation step or a model pyramid calculation process). The model pyramid has a pyramid structure obtained by reducing sizes of edges extracted from the reference image and forming edge layers based on a size reduction factor (based on a resolution). Therefore, the model pyramid has a plurality of layers of different size reduction factors (resolutions). Each of the layers of the model pyramid includes edges (model edges). Specifically, edges extracted from the reference image are included in a first layer corresponding to a size reduction factor of 1, and size-reduced edges obtained by reducing sizes of the edges extracted from the reference image are included in layers corresponding to size reduction factors other than 1 (for example, a layer corresponding to a size reduction factor of ½ and a layer corresponding to a size reduction factor of ¼). Here, the size reduction factor means a degree of size reduction, the larger the size reduction factor becomes, the smaller a size reduction target becomes. For example, a size reduction factor of ½ means that a size of a size reduction target is reduced to ½. Then the size reduction factor ¼ is larger than the size reduction factor ½ (the comparison is performed based, on a denominator in terms of number).

Hereinafter, a model pyramid calculation step (a model pyramid calculation process) of calculating (generating) a model pyramid will be described in detail.

The CPU 201 causes the camera 105 to capture an image of the work W under an illumination condition in an ideal state and installed in a position in an ideal state so as to obtain a reference image (step S1). Although a case where a reference image is obtained by the camera 105 is illustrated in the first embodiment, the reference image may be obtained by the external storage device 120 or a network, for example.

Subsequently, the CPU 201 extracts edge points in the reference image (step S2). Specifically, the CPU 201 sets an edge extraction region in the reference image and calculates luminance gradient intensity (edge amplitude) and a luminance gradient direction (an edge direction) for each pixel in the edge extraction region. Data on the edge extraction region is stored (set) in the storage unit, such as the HDD 204, in advance. The edge amplitude is calculated using a Sobel filter (an edge extraction filter) in x and y directions.

Figure 5:
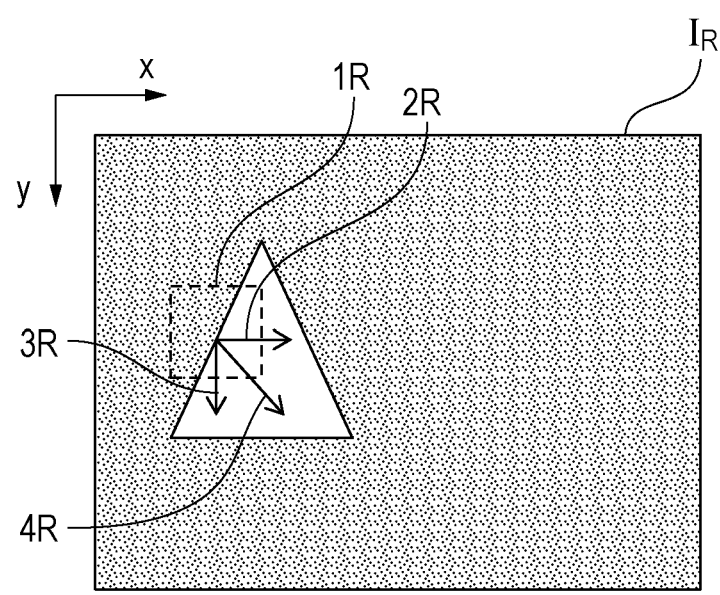
FIG. 5 is a diagram illustrating an operation of extracting an edge point according to the first embodiment.

FIG. 5 is a diagram illustrating an operation of extracting edge points according to the first embodiment. First, as illustrated in FIG. 5, the CPU 201 calculates edge amplitude (gradient intensity) 2R in the x direction and edge amplitude (gradient intensity) 3R in the y direction of a certain target pixel 1R included in a reference image $I_R$.

Edge amplitude 4R of the target pixel 1R is calculated by the square root of a sum of the square of the edge amplitude 2R and the square of the edge amplitude 3R in the x and y directions, respectively, (Expression 1). Furthermore, the edge direction is calculated in accordance with Expression 2 below using the edge amplitude 2R in the x direction and the edge amplitude 3R in the y direction.

$$E=\sqrt{E^2_x + E^2_y}$$ Expression 1

E: edge amplitude
$E_x$: edge amplitude in x direction
$E_y$: edge amplitude in y direction $$\theta = \arctan\left(\frac{E_y}{E_x}\right)$$ Expression 2

θ: edge direction

After calculating edge amplitude and edge directions of all pixels included in the reference image the CPU 201 extracts pixels having edge amplitude equal to or larger than a certain threshold value. Furthermore, the CPU 201 performs a thinning process by performing non-maximum suppression in an edge direction on the extracted pixels having the edge amplitude equal to or larger than the threshold value so as to specify a position where the edge amplitude becomes locally largest. Here, the edge points nave, in addition to information on coordinates (edge position coordinates), information on edge amplitude and information on edge directions in the edge position coordinates. Since the edge points nave the information on edge amplitude and the information on the edge directions, the edge points may be used as vectors. In size reduction of an edge described below, a size reduction process is performed using the edge as a vector. Although the Sobel filter is used for calculation of the edge amplitude and the edge directions in the first embodiment, an edge extraction filter, such as a Canny filter, may be used.

Next, the CPU 201 generates an edge by collecting a plurality of edge points according to the relationships among the edge points (S3). For example, the CPU 201 collects edge points having small distances therebetween (distances are equal to or smaller than a predetermined distance). Note that the CPU 201 may collect edge points according to a feature of the work W to obtain a new edge. For example, in a case where the work W has a circle shape, edge points which configure the circle shape may be collected so that a new edge is obtained. By collecting edge points as an edge, image processing utilizing a feature of the edge may be performed.

In this way, the CPU 201 extracts a plurality of edges from the reference image in step S2 and step S3 (an edge extraction step or an edge extraction process). Since an edge extraction region is set in the reference image in the first embodiment, the CPU 201 extracts edge points from the set edge extraction region in step; S2 and calculates edges using the extracted edge points. Specifically, a plurality of edges are extracted from the edge extraction region.

Thereafter, the CPU 201 calculates sizes of the individual edges (S4: a size calculation step or a size calculation process). In the first embodiment, a circumscribed rectangle of an edge is calculated and a length of a short side of the circumscribed rectangle is obtained as a size of the edge. Note that, as a size of the edge, density of the edge points in the circumscribed rectangle of the edge may be calculated. Alternatively, as a size of the edge, a length or am area of the edge may be calculated. In this way, a plurality of feature values characterizes a size of an edge, and each of the feature values may be solely used or a plurality of the feature values may be combined with one another.

Subsequently, the CPU 201 obtains a maximum size reduction factor corresponding to a size of the edge for each edge (S5: a maximum size reduction factor calculation step or a maximum size reduction factor calculation process). The maximum size reduction factor is a numeric value indicating a degree of maximum size reduction performed on an edge.

Figure 6:
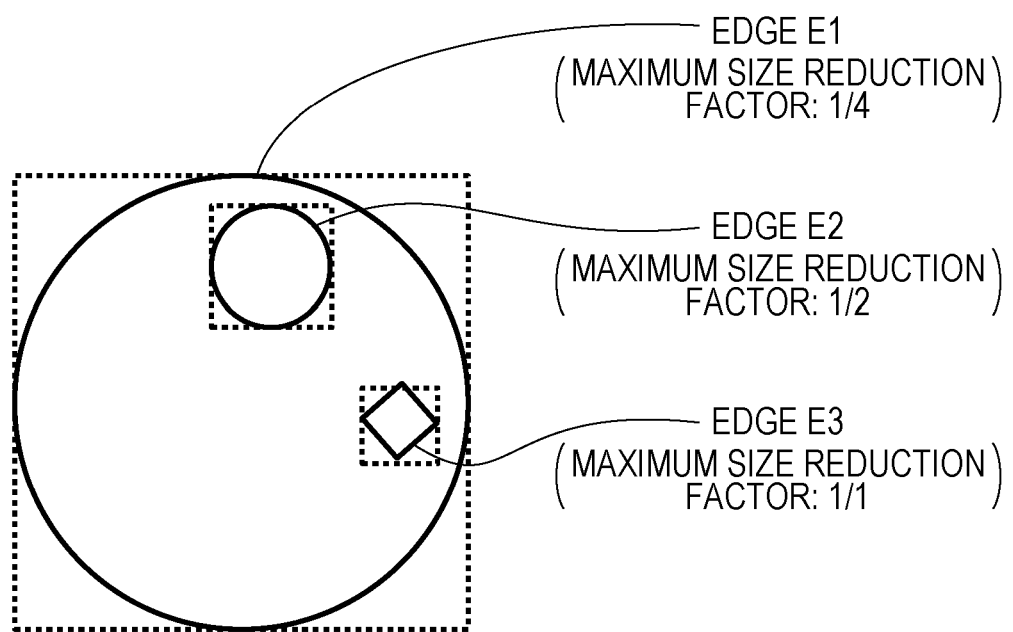
FIG. 6 is a diagram schematically illustrating edges in which obtained maximum size reduction factors are set according to the first embodiment.

FIG. 6 is a diagram schematically illustrating edges in which obtained maximum size reduction factors are set according to the first embodiment. As illustrated in FIG. 6, different maximum size reduction factors are set for different sizes of edges. Specifically, the larger a size of an edge is, the larger the maximum size reduction factor is set. It is assumed that three edges E1 to E3 are extracted from the reference image $I_R$. Maximum size reduction factors are obtained in accordance with sizes of the edges E1 to E3. In an example of FIG. 6, a maximum size reduction factor of the edge E1 is ¼, a maximum size reduction factor of the edge E2 is ½, and a maximum size reduction factor of the edge E3 is 1/1.

Here, as a size of an edge is smaller, the edge is more likely to blur and to be affected by environmental noise, and therefore, a smaller maximum size reduction factor is set. On the other hand, as a size of an edge is larger, a larger maximum, size reduction factor may be set resulting in high-speed processing. A calculation formula of the maximum size reduction factor is represented by Expression 3, for example. Therefore, the CPU 201 obtains the maximum size reduction factors in accordance with Expression 3. In Expression 3, "maxMinimize" denotes a maximum size reduction factor and "L" denotes a size of an edge.

$$\max \text{Minimize} = \text{floor}(L/2),$$

$$\text{floor}(x) = \{n \in Z | n \leq x\}) \quad \text{Expression 3}$$

Figure 7A:
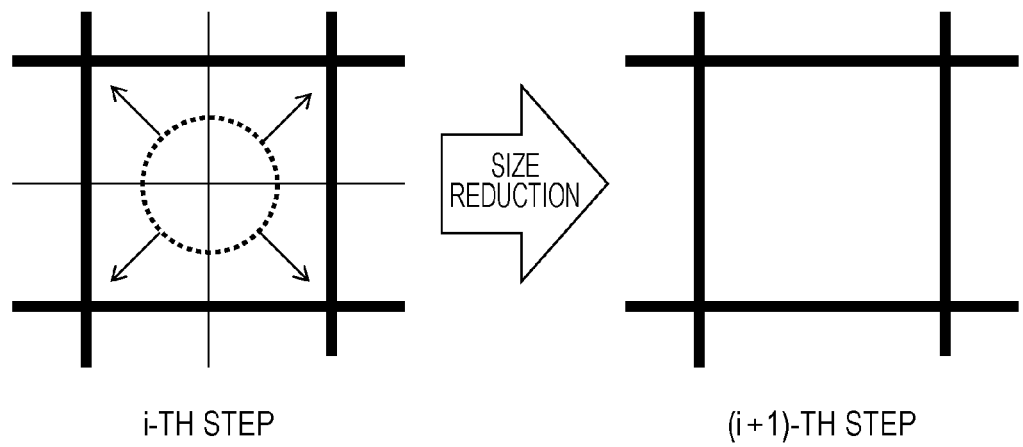
FIG. 7A is a diagram illustrating a case where an edge disappears.
Figure 7B:
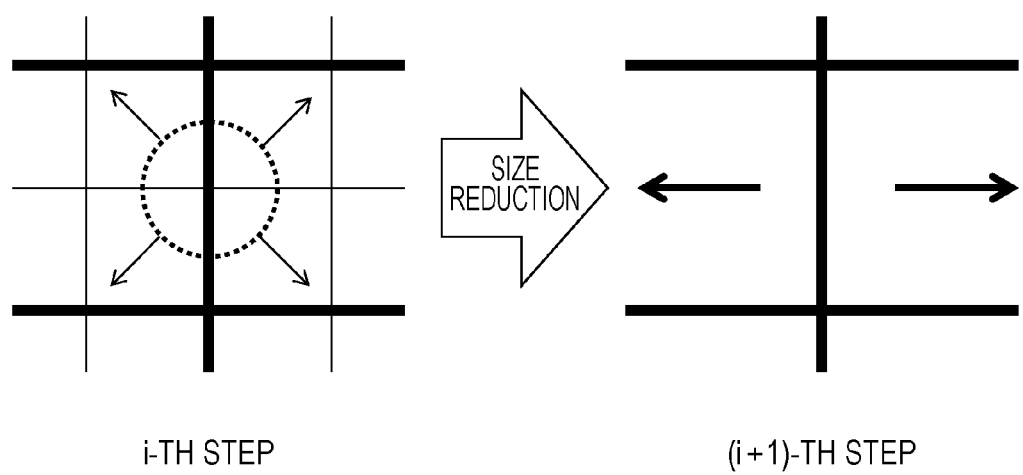
FIG. 7B is a diagram illustrating a case where an edge blurs.

Here, "disappearance" and "blur" of an edge which occur when a size of an edge is reduced will be described. FIG. 7A is a diagram illustrating a case where an edge disappears. FIG. 7B is a diagram illustrating a case where an edge blurs. In a case where a size of an edge of an i-th step in the pyramid is reduced to obtain an edge of (i+1)-th step (½ times), a region of the edge is divided based on a unit of 2×2 pixels. In a case where an edge of 2×2 pixels is reduced to 1 pixel as illustrated in FIG. 7A, edge points may disappear when four edge vectors (edge amplitude and edge directions) are synthesized with one another. Furthermore, as illustrated in FIG. 7B, in a case where am edge of 2×2 pixels is reduced using a certain position which is different from that in FIG. 7A as a reference, edge directions are changed from original features, and therefore, a blur may be generated.

According to the first embodiment, an edge blur is avoided when a size of an edge is reduced to generate a model pyramid from the reference image. Therefore, the CPU 201 reduces the sizes of the edges based on the calculated maximum size reduction factors for individual edges (S6). After performing the size reduction process on all the edges, the CPU 201 collects the edges according to the size reduction factors so as to generate a model pyramid based on the size reduction factors (S7). Specifically, this process is realized by repeatedly performing the size reduction in a range in which the maximum, size reduction factors are not exceeded for individual edges. Here, the CPU 201 successively increases the size reduction factors starting from a layer of the smallest size reduction factor in the plurality of layers of the model pyramid, that is, the layer of the size reduction factor of 1/1. In this case, a layer to be generated among the plurality of layers is determined as a target layer. When generating the target layer in step S6 and step S7, the CPU 201 sets an edge which corresponds to an edge having a size reduction factor equal to or larger than the size reduction factor of the target layer and which has a size reduction factor which is changed to the size reduction factor of the target layer as a model edge of the target layer (a setting step or a setting process).

In the first embodiment, the CPU 201 extracts edges having maximum size reduction factors equal to or larger than the size reduction factor of the target layer from, among the plurality of edges in step S6 and step S7, performs calculation so that the extracted edges have the size reduction factor of the target layer, and sets the extracted edges as model edges in the target layer. Furthermore, in a case where the size reduction factor of the target layer is 1/1, that is, 1, the CPU 201 sets the plurality of edges as model edges of the target layer in step S6 and step S7.

Hereinafter, the sizes of the edges are reduced to ½ by one size reduction for simplicity of description. For example, in a case of the edge E1 of FIG. 6, since the edge E1 has the maximum size reduction factor of ¼, the size reduction is performed twice. In this case, an edge which has been subjected to the size reduction once is referred to as an "edge E1'" and an edge which has been subjected to the size reduction twice is referred to as an "edge E1''". Similarly, the size reduction is performed once on the edge E2. In this case, the edge which has been subjected to the size reduction once is referred to as an "edge E2'". The edge E3 is not subjected to the size reduction.

Figure 8:
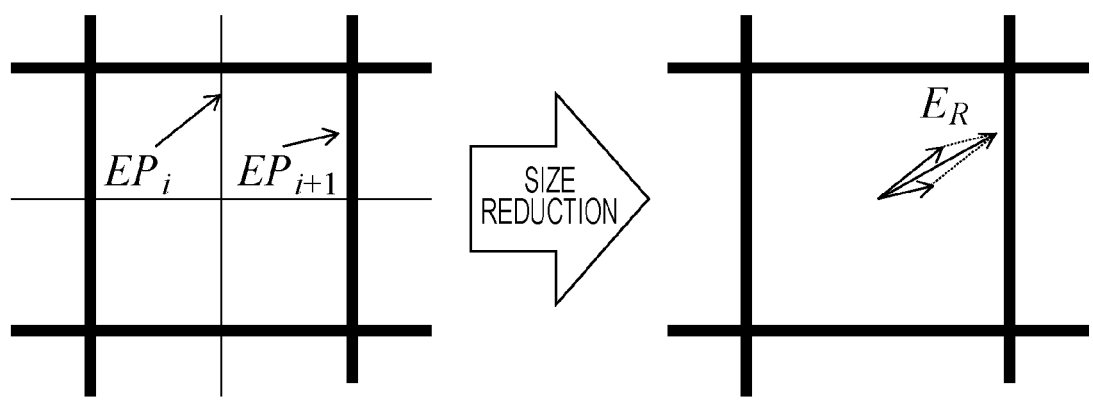
FIG. 8 is a diagram illustrating synthesis of edge points at a time of edge reduction.

FIG. 8 is a diagram illustrating synthesis of edge points at a time of the size reduction of an edge. The size reduction of an edge will now be described in detail with reference to FIG. 8. A region of interest in a unit of 2×2 pixels is generated. Next, all edge points included in the region of interest are subjected to vector synthesis. An edge amplitude $E_R$ and an edge direction $\theta_R$ after the vector synthesis are calculated in accordance with Expressions 4 to 7 below.

$$E_{xR} = \sum_{i=0}^{N-1} e_i \cos\theta_i, N = 4 \quad \text{Expression 4}$$

$$E_{yR} = \sum_{i=0}^{N-1} e_i \sin\theta_i, N = 4 \quad \text{Expression 5}$$

$$E_R = \sqrt{E_{xR}^2 + E_{yR}^2} \quad \text{Expression 6}$$

$$\theta_R = \tan\frac{E_{yR}}{E_{xR}} \quad \text{Expression 7}$$

Here, "$e_i$" and "$\theta_i$" (i=0 to 3) indicate an edge amplitude and an edge direction, respectively, of an edge point $EP_i$ included in the region of interest. Finally, the region of interest is shifted such that the region of interest does not include a pixel which has been subjected to the size reduction processing. By repeatedly performing the processing described above, size reduction of the edge is performed.

Figure 9:
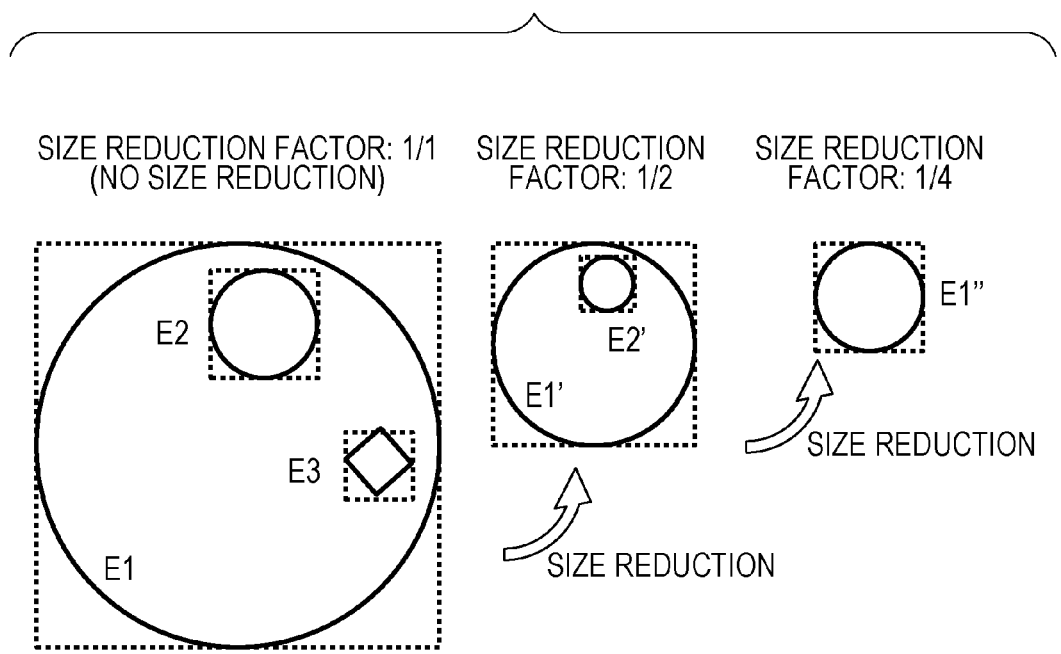
FIG. 9 is a diagram schematically illustrating a model pyramid.

FIG. 9 is a diagram schematically illustrating the model pyramid. As illustrated in FIG. 9, the layer of the size reduction factor of 1/1 (no size reduction) in the model pyramid includes the edges E1 to E3. The layer of the size reduction factor of ½ in the model pyramid only includes the edges E1' and E2' since the size of the edge E3 having the maximum size reduction factor of 1 is not reduced. The layer of the size reduction factor of ¼ in the model pyramid only includes the edges E1'' since the size of the edge E3 having the maximum size reduction factor of 1 and the size of the edge E2 having the maximum size reduction factor of ½ are not reduced.

Specifically, in a case where the layer of the size reduction factor of 1/1 is set as a target layer, the plurality of edges E1 to E3 are set as model edges in the target layer. Furthermore, in a case where ½ size reduction is to be performed, that is, the layer of the size reduction factor of ½ is determined as a target layer, the edges E1 and E2 which have the maximum size reduction factors equal to or larger than the size reduction factor of the target layer are extracted from among the plurality of edges E1 to E3. The CPU 201 performs calculation of size reduction with the size reduction factor of ½ corresponding to the target layer on the extracted edges E1 and E2 so as to obtain the edges E1' and E2' to be set as model edges in the target layer. Furthermore, in a case where ¼ size reduction is to be performed, that is, the layer of the size reduction factor of ¼ is determined as a target layer, the edge E1 which has the maximum size reduction factor equal to or larger than the size reduction factor of the target layer is extracted from among the plurality of edges E1 to E3. The CPU 201 performs calculation of size reduction with the size reduction factor of ¼ corresponding to the target layer on the extracted edge E1 so as to obtain the edge E1'' to be set as a model edge in the target layer. Specifically, the edge E1' is subjected to the ½ size reduction so that the edge E1'' is obtained.

The model pyramid obtained as described above is stored in the storage unit, such as the HDD 204. Furthermore, the largest one of the maximum size reduction factors is stored in the storage unit, such as the HDD 204, as a model maximum size reduction factor to be used when the search target image is subjected to the size reduction in the pattern matching described below. Specifically, in the case of FIG. 6, the maximum size reduction factor of ¼ of the edge E1 is stored in the HDD 204 as the model maximum size reduction factor.

The model pyramid calculation method (a calculation step or a calculation process) is described hereinabove. When the pattern matching is actually performed, the model pyramid is read from the HDD 204 which is the storage unit.

The flowchart of FIG. 4 will be described hereinafter. First, the CPU 201 reads and inputs the model pyramid stored in the HDD 204 (S11).

Subsequently, the CPU 201 causes the camera 105 to capture an image of the work W under the illumination condition of the model generation and installed in the position in the model generation so as to obtain a search target image from the camera 105 (step S12).

Then, the CPU 201 obtains a search target pyramid based on the search target image (S13: a search target pyramid calculation step or a search target pyramid calculation process). The search target pyramid has a pyramid structure obtained by reducing sizes of edges extracted from the search target image and forming edge hierarchy according to a size reduction factor (according to a resolution). Specifically, the structure of the search target pyramid is the same as that of the model pyramid. The search target pyramid also has different layers of different size reduction factors (resolutions), and the layers include edges (search target edges). The number of layers (steps) of the search target pyramid is the same as the number of layers (steps) of the model pyramid. Furthermore, size reduction factors of the layers of the search target pyramid are the same as those of the model pyramid. Specifically, the search target pyramid has layers having size reduction factors the same as those of the model pyramid. If the model pyramid has the layers of the size reduction factors of 1, ½, and ¼, a search target pyramid having layers of size reduction factors of 1, ½, and ¼ is generated.

The process in step S13 will now be described in detail. The CPU 201 extracts edge points in the search target image obtained in step S12 using the Sobel filter (the edge extraction filter). When the model pyramid is generated in step S1 to step S7, the thinning process is performed by performing non-maximum suppression on the edge points. However, score calculation of the pattern matching described below is mainly performed on the edge points of the model, and therefore, the thinning process is not required to be performed on the search target image. Then the CPU 201 repeatedly performs the size reduction on extracted edges so as to generate the search target pyramid. The vector synthesis is used as a size reduction method. Here, the size reduction is performed to the maximum size reduction factor of the model pyramid stored in advance, and unnecessary size reduction is not performed.

The CPU 201 performs the pattern matching by the coarse-to-fine search method using the model pyramid on the search target pyramid (S14: a matching step or a matching process).

Figure 10:
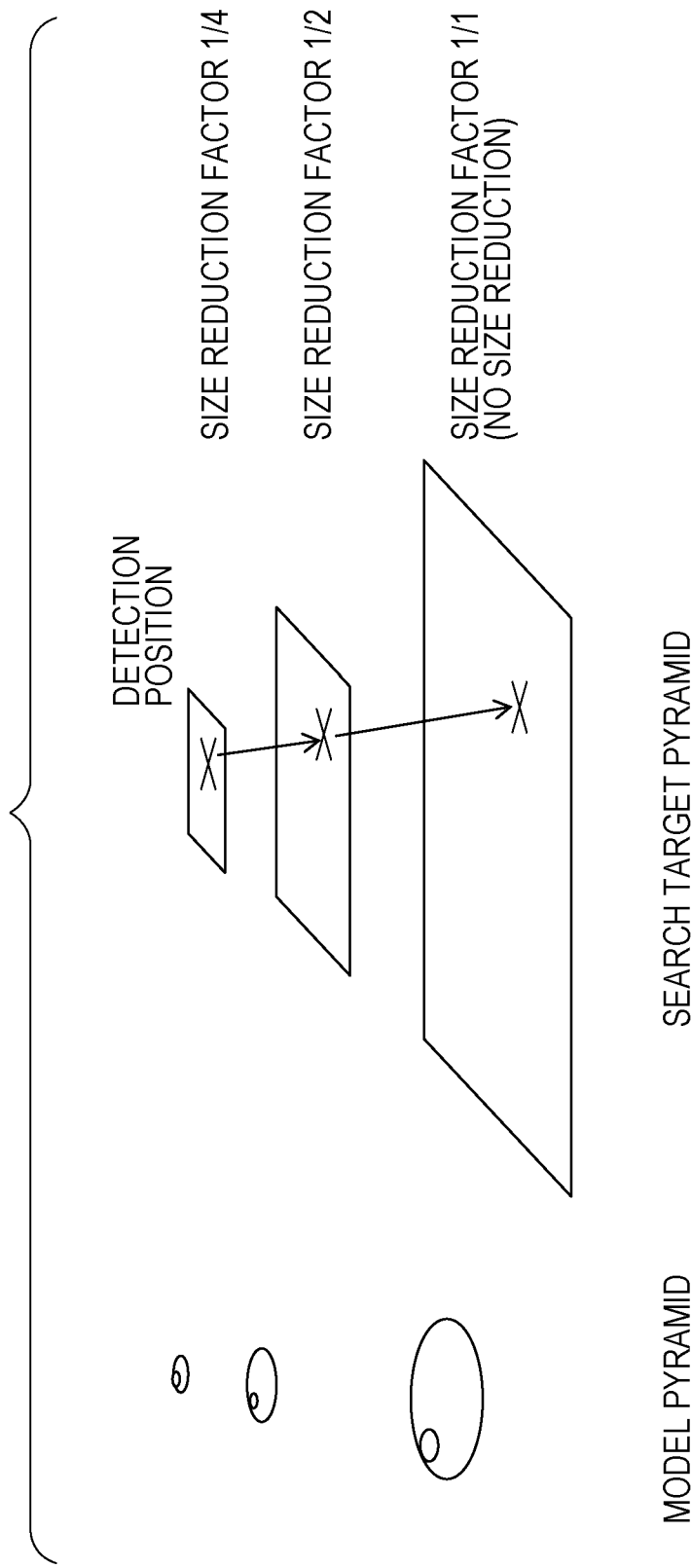
FIG. 10 is a concept diagram illustrating a coarse-to-fine search method.

FIG. 10 is a concept diagram illustrating the coarse-to-fine search method. First, edges in a layer of the lowest resolution, that is, in which a size thereof is reduced the most (the size reduction factor is largest) are searched for a work serving as a detection target object in both of the pyramids. This is generally referred to as a "coarse search". In the coarse search, an entire range in an image in which the work may be moved is subjected to the search. However, a large amount of data is reduced when compared with data before the size reduction, and therefore, a position of the work may be detected at high speed. Information on the detected position is to be used in a fine search described below. Note that a plurality of positions may be detected.

The fine search is performed after the coarse search. The coarse search and the fine search are different from each other in that the fine search uses a result of a preceding detection. In the fine search, only a portion in the vicinity of the preceding detection position which is roughly specified is subjected to the search so that high-speed processing is realized. By repeatedly performing the fine search, a position of the search target object may be specified with higher accuracy when compared with the preceding detection result. While the fine search is repeatedly performed, highly-reliable positions are detected, and therefore, the number of candidates used in the next fine search is gradually reduced and one of remaining candidate positions which is most reliable is determined as a detection position in final search. Here, a position which has a highest score, that is, which is most similar to the model is selected as the highly-reliable detection position.

Figure 11:
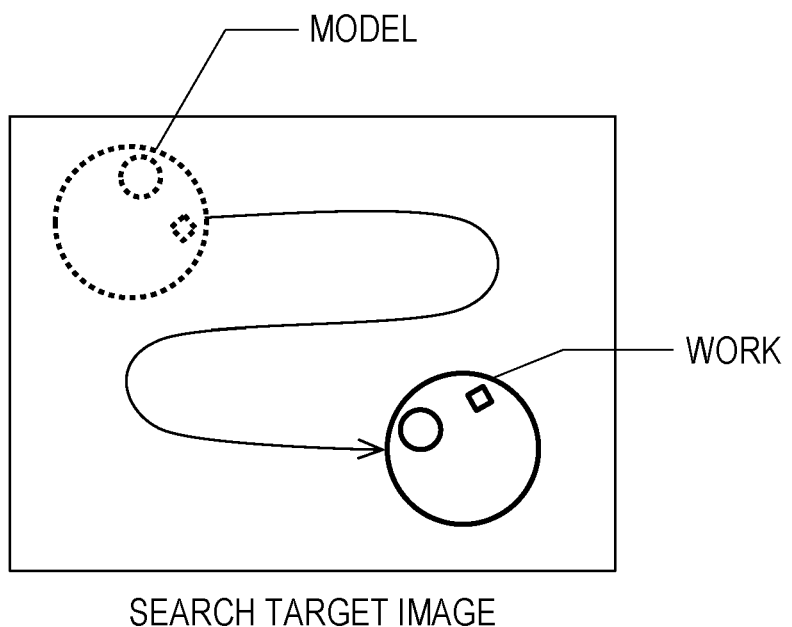
FIG. 11 is a diagram, schematically illustrating pattern matching.

FIG. 11 is a diagram schematically illustrating the pattern matching. The score calculation in the pattern matching will be described with reference to FIG. 11. While the model performs parallel shift in a unit of pixel in an image, scores in various positions are calculated in individual positions. A score $S_{ij}$ in an arbitrary position (i, j) is calculated in accordance with Expression 8.

$$S_{ij} = \frac{1}{N}\sum_{k=0}^{N-1} s_k \qquad \text{Expression 8}$$

$S_{ij}$: score at (i, j)
N: the number of edges of model
$s_k$: local score

Here, the local score $s_k$ is calculated for each edge point of the model and represented by a cosine value of a difference between an edge direction of a certain edge point in the search target image and an edge direction of the certain edge point in the model (Expression 9).

$$s_k \cos(\theta_{Tk}-\theta_{Mk}), k=1,\ldots,N \qquad \text{Expression 9}$$

$\theta_{Tk}$: edge direction of search target image
$\theta_{Mk}$: edge direction of model
k: index of edge point of model A range of a possible value of the local score is a range from −1 to 1. Furthermore, a sum of the local scores is divided by the number of edge points for normalization, and therefore, a range of a score possible value is a range from −1 to 1. When a score of an arbitrary position is calculated by the calculation described above, a threshold value determination is performed to determine whether detection is successfully performed. If the score is equal to or larger than the predetermined threshold value, the arbitrary point is determined as a matching candidate point and a score of a next position is calculated after the detection position and the score are stored whereas if the score is smaller than the threshold value, a score calculation is performed on a next position. After all scores in the various positions are calculated, it is determined that detection using the shape pattern matching has been successfully performed if a matching candidate point is detected. Thereafter, information on the score and information on the detection position (i, j) of the matching candidate point having the largest score among the matching candidates are output.

According to the first embodiment, the model pyramid is generated based on the maximum size reduction factors calculated for individual edges using sizes of edges, and accordingly, an unstable model edge having a blur or the like may be prevented from being generated in each of the layers of the model pyramid. Accordingly, since the pattern matching is performed using the model pyramid which does not include an unstable edge, the pattern matching may be realized at high speed, with high robustness, and with high accuracy.

Second Embodiment

Next, an image processing method according to a second embodiment of the present invention will be described. FIG. 12 is a flowchart illustrating the image processing method according to the second embodiment of the present invention. A configuration of an image processing apparatus according to the second embodiment is the same as that of the first embodiment, but the second embodiment is different from the first embodiment in a process of a CPU 201, that is, a program 240, and more specifically, a method for generating a model pyramid. In the second embodiment, as with the first embodiment, the CPU 201 executes steps (processes) of the image processing method (a model pyramid generation method) illustrated in FIG. 12 in accordance with the program 240.

The CPU 201 obtains a model pyramid based on a reference image (S21 to S27: a model pyramid calculation step or a model pyramid calculation process). Here, the process from step S21 to step S25 illustrated in FIG. 12 is the same as the process from step S1 to step S5 illustrated in FIG. 3. Specifically, the CPU 201 extracts edge points from a reference image (S21 and S22), collects the edge points so as to generate edges (S23), calculates sizes of the individual edges (S24), and calculates maximum size reduction factors in accordance with the sizes of the edges (S25).

When generating a target layer among a plurality of layers of the model pyramid, the CPU 201 sets an edge having a size reduction factor which is equal to or larger than a size reduction factor of the target layer and which is subjected to size reduction by the size reduction rate of the target layer, among a plurality of layers of the model pyramid, as a model edge of the target layer (S26 and S27). Specifically, a setting step (a setting process) is performed in step S26 and step S27.

In the second embodiment, the CPU 201 performs size reduction on the reference image in step S26 using the largest maximum size reduction factor among maximum size reduction factors of a plurality of edges as an upper limit and obtains a size-reduced image of the size reduction factor corresponding to the target layer. For example, among maximum size reduction factors of a plurality of edges E1 to E3, the largest maximum size reduction factor is ¼. The maximum size reduction factor of ¼ is set as an upper limit, and the reference image is subjected to size reduction so that a size-reduced image is obtained. For example, a size-reduced image reduced with the size reduction factor of ½ and a size-reduced image reduced with the size reduction factor of ¼ are obtained.

In each of the size-reduced images, the CPU 201 sets a size reduction edge extraction region having a size reduction factor the same as that of the size-reduced image in a region other than a region including edges having maximum size reduction factors smaller than the size reduction factor of the size-reduced image in the size-reduced image. In step S27, the CPU 201 sets edges extracted from the size reduction edge extraction region as model edges of the target layer. For example, in the layer of the size reduction factor of ½, edges E1' and E2' which are extracted from the size reduction edge extraction region are set as model edges, and in the layer of the size reduction factor of ¼, an edge E1" extracted from the size reduction edge extraction region is set as a model edge.

The process in step S26 will be described in detail. The CPU 201 reduces sizes of the reference image and the edge extraction region in accordance with the calculated maximum size reduction factor for each edge. Specifically, this process is realized by repeatedly performing the size reduction in a range in which the maximum size reduction factors are not exceeded on the reference image and the edge extraction region.

Here, a region including an edge having a size reduction factor which exceeds the maximum size reduction factor is excepted from the edge extraction region in advance before the edge extraction region is subjected to the size reduction so that an unstable edge is not extracted.

Hereinafter, the sizes of the edges are reduced by ½ for one size reduction for simplicity of description. First, size reduction of the edge extraction region will be described in detail. The region is equivalent to a binary image. Accordingly, a case of a binary image is described after a general image size reduction method is illustrated first.

A general image size reduction method will be described hereinafter. First, in a case where size reduction of the size reduction factor of ½ is to be performed, a region of interest in a unit of 2×2 pixels is generated. Next, an average value of luminance values of all the pixels included in the region of interest is calculated, and is determined as a luminance value after the size reduction. Finally, the region of interest is shifted such that the region of interest does not include a pixel which has been subjected to the size reduction processing. The process is repeatedly performed, and when the shift in the entire region of interest is terminated, an image which is a size-reduced image of the reference image is generated.

Here, in the case of a binary image, to obtain a binary image after the size reduction, a binary average value is required to be obtained. In the second embodiment, if the average value is equal to or larger than a threshold value, the binary value is 1, whereas if the average value is smaller than the threshold value, the binary value is 0, and the threshold value is 0. By this, an edge extraction region after the size reduction reliably includes a region corresponding to an edge extraction region before the size reduction.

Next, a method for excepting a region including an edge having a size reduction factor larger than the maximum size reduction factor from the edge extraction region in advance will be described hereinafter.

First, as with the edge size reduction method, a size of an edge is reduced based on a calculated maximum size reduction factor for each edge. Specifically, this process is realized by repeatedly performing the size reduction in a range in which the maximum size reduction factors are not exceeded for individual edges.

In a case of the edge E1 of FIG. 6, since the edge E4 has the maximum size reduction factor of ¼, the size reduction is performed twice. In this case, the edge which has been subjected to the size reduction once is referred to as an "edge E1'" and the edge which has been subjected to the size reduction twice is referred to as an "edge E1''". Similarly, the size reduction is performed once on the edge E2. In this case, the edge which has been subjected to the size reduction once is referred to as an "edge E2'". An edge E3 may not be further subjected to the size reduction.

After performing the size reduction process on all the edges, the CPU 201 collects edges according to the size reduction factors so as to generate regions. When the edge regions are to be generated, an expansion process may be performed in practice in accordance with a width of a Sobel filter. Then, an overlap region between a region including edges having the same size reduction factor and the edge extraction region is newly determined as a size-reduction edge extraction region of the size reduction factor. By this, the size-reduction edge extraction region of an arbitrary size reduction factor does not include an unstable edge.

Note that, although the size-reduction edge extraction region is obtained by excepting a region required to be excepted from the size reduction region after a size of the edge extraction region is reduced in the second embodiment, the size-reduction edge extraction region may be obtained by performing size reduction on a remaining region after the region required to be excepted from the edge extraction region.

Next, the CPU 201 generates a model pyramid using the reference image, the size-reduced image, the edge extraction region, and the size-reduction edge extraction region in step S27. Images of the same size reduction factor and edges extracted from the edge extraction region are determined as models of the size reduction factor.

The pattern matching method illustrated in the flowchart of FIG. 4 in the first embodiment may be used, and therefore, description thereof is omitted.

According to the second embodiment, as with the first embodiment, the model pyramid is generated based on the maximum size reduction factors calculated using sizes of the edges for individual edges, and accordingly, an unstable model edge having a blur or the like may be prevented from being generated in each of the layers of the model pyramid. Accordingly, since the pattern matching is performed using the model pyramid which does not include an unstable edge, the pattern matching may be realized at high speed, with high robustness, and with high accuracy.

Note that the present invention is not limited to the foregoing embodiments, and various modifications may be made within the scope of the present invention. Furthermore, the preferred effects of the present invention are described in the embodiments of the present invention, and the effects of the present invention are not limited to those described in the embodiments of the present invention.

The present invention may be realized by a process of supplying a program which realizes at least one of the functions of the foregoing embodiments to a system or an apparatus through a network or a storage medium and reading and executing the program by at least one processor of a computer included in the system or the apparatus. Furthermore, the present invention may be realized by a circuit (an application-specific integrated circuit (ASIC), for example) which realizes at least one of the functions.

Furthermore, although the case where the search target pyramid is obtained by extracting edges from the search target image and reducing sizes of the edges is described in the foregoing embodiment, the search target pyramid may be obtained by extracting edges from, the search target image and a size-reduced image obtained by performing the size reduction on the search target image. In this case, although edge extraction may be performed, on an entire image, in a lower layer of a small size reduction factor, only a minimal region required for the pattern matching in an image may be subjected to edge extraction using a result of the pattern matching performed in am upper layer of a larger size reduction factor. In this case, the search target pyramid calculation process and the matching process are repeatedly performed until a lowest layer of the search target pyramid, corresponds to the size reduction factor (that is, a size reduction factor of 1/1) of the search target image.

While the present invention has been described with reference to exemplary embodiments, it is to be understood that the invention is not limited, to the disclosed exemplary embodiments. The scope of the following claims is to be accorded the broadest interpretation so as to encompass all such modifications and equivalent structures and functions.

This application claims the benefit of Japanese Patent Application No. 2015-163968, filed Aug. 21, 2015, which is hereby incorporated by reference herein in its entirety.

What is claimed is:

1. An image processing method to cause a processor to perform pattern matching on a search target image using a reference image, the image processing method comprising:
   causing the processor to calculate a model pyramid which has different layers having different size reduction factors and which includes model edges in individual layers of the model pyramid using the reference image;
   causing the processor to calculate a search target pyramid which has layers having size reduction factors which are the same as those in the layers of the model pyramid and which includes search target edges in individual layers of the search target pyramid using the search target image; and causing the processor to perform pattern matching on the search target pyramid using the model pyramid,
wherein the calculation of the model pyramid includes
causing the processor to extract a plurality of edges from, the reference image,
causing the processor to calculate sizes of extracted individual edges,
causing the processor to obtain maximum size reduction factors of the individual edges in accordance with the calculated sizes of the extracted individual edges, and
causing the processor to set, when a target layer which is a target one of the plurality of layers of the model pyramid is to be generated, an edge which has a maximum size reduction factor equal to or larger than a size reduction factor of the target layer and which has been subjected to size reduction by the size reduction factor of the target layer as a model edge of the target layer, an edge which has a maximum size reduction factor smaller than the size reduction factor of the target layer being excluded from the edge to be set as the model edge.

2. The image processing method according to claim 1, wherein extracting the plurality of edges includes causing the processor to set an edge extraction region in the reference image and to extract the plurality of edges from the edge extraction region.

3. The image processing method according to claim 1, wherein setting the model edge of the target layer includes (i) causing the processor to extract edges, from among the plurality of edges, having size reduction factors equal to or larger than the size reduction factor of the target layer, (ii) causing the processor to perform size reduction on the extracted edges by the size reduction factor of the target layer, and (iii) causing the processor to set the extracted edges as model edges in the target layer.

4. The image processing method according to claim 1, wherein setting the model edge of the target layer includes
(i) causing the processor to perform size reduction on the reference image while the largest one of the maximum size reduction factors of the plurality of edges is set as an upper limit so as to obtain a size-reduced image having the size reduction factor of the target layer,
(ii) causing the processor to set, in the size-reduced image, a size reduction edge extraction region having a size reduction factor that is the same as that of the size-reduced image in a region other than a region including edges having maximum size reduction factors smaller than the size reduction factor of the size-reduced image, and
(iii) causing the processor to set edges extracted from the size reduction edge extraction region as the model edges in the target layer.

5. The image processing method according to claim 1, wherein, in a case where the target layer corresponds to a layer of a size reduction factor of 1, setting the model edge includes causing the processor to set the plurality of edges as the model edges of the target layer.

6. The image processing method according to claim 1, wherein calculating the search target pyramid includes causing the processor to obtain a search target edge by performing size reduction on an edge extracted from the search target image.

7. A non-transitory computer readable recording medium on which a program is recorded to cause a computer to perform the image processing method according to claim 1.

8. An image processing apparatus comprising:
a processor which performs pattern matching on a search target image using a reference image, wherein the processor is configured to execute
a process of calculating a model pyramid which has different layers having different size reduction factors and which includes model edges in individual layers of the model pyramid using the reference image;
a process of calculating a search target pyramid which has layers having size reduction factors which are the same as those in the layers of the model pyramid and which includes search target edges in individual layers of the search target pyramid using the search target image; and
a process of performing pattern matching on the search target pyramid using the model pyramid,
wherein the process of calculating the model pyramid includes
a process of extracting a plurality of edges from the reference image,
a process of calculating sizes of extracted individual edges,
a process of obtaining maximum size reduction factors of the individual edges in accordance with the calculated sizes of the extracted individual edges, and
a process of setting, when a target layer which is a target one of the plurality of layers of the model pyramid is to be generated, an edge which has a maximum size reduction factor equal to or larger than a size reduction factor of the target layer and which has been subjected to size reduction by the size reduction factor of the target layer as a model edge of the target layer, an edge which has a maximum size reduction factor smaller than the size reduction factor of the target layer being excluded from the edge to be set as the model edge.

9. The image processing apparatus according to claim 8, wherein the process of extracting the plurality of edges includes a process of setting an edge extraction region in the reference image and extracting the plurality of edges from the edge extraction region.

10. The image processing apparatus according to claim 8, wherein the process of setting the model edge of the target layer includes (i) a process of extracting edges, from among the plurality of edges, having size reduction factors equal to or larger than the size reduction factor of the target layer, (ii) a process of performing size reduction on the extracted edges by the size reduction factor of the target layer, and (iii) a process of setting the extracted edges as model edges in the target layer.

11. The image processing apparatus according to claim 8, wherein the process of setting the model edge of the target layer includes
(i) a process of performing size reduction on the reference image while the largest one of the maximum, size reduction factors of the plurality of edges is set as an upper limit so as to obtain a size-reduced image having the size reduction factor of the target layer,
(ii) a process of setting, in the size-reduced image, a size reduction edge extraction region having a size reduction factor that is the same as that of the size-reduced image in a region other than a region including edges having maximum size reduction factors smaller than the size reduction factor of the size-reduced image, and (iii) a process of setting edges extracted from the size reduction edge extraction region as the model edges in the target layer.

12. The image processing apparatus according to claim 8, wherein, in a case where the target layer corresponds to a layer of a size reduction factor of 1, the process of setting the model edge includes a process of setting the plurality of edges as the model edges of the target layer.

13. The image processing apparatus according to claim 8, wherein the process of calculating the search target pyramid includes a process of obtaining a search target edge by performing size reduction on an edge extracted from the search target image.

14. The image processing apparatus according to claim 8, further comprising a storage unit configured to store the model pyramid obtained by the processor,
wherein the processor is configured to execute a process of reading the model pyramid from the storage unit and performing the matching process.

* * * * *